(12) United States Patent
Fang et al.

(10) Patent No.: US 10,933,315 B2
(45) Date of Patent: Mar. 2, 2021

(54) GAME MACHINE

(71) Applicants: Hao-Jen Fang, Taipei (TW);
Chuang-Yuan Cheng, Taipei (TW);
Chen-Yi Huang, Taipei (TW);
Chen-Cheng Wang, Taipei (TW);
Sheng-Hung Lee, Taipei (TW);
Hsuan-I Chao, Taipei (TW)

(72) Inventors: Hao-Jen Fang, Taipei (TW);
Chuang-Yuan Cheng, Taipei (TW);
Chen-Yi Huang, Taipei (TW);
Chen-Cheng Wang, Taipei (TW);
Sheng-Hung Lee, Taipei (TW);
Hsuan-I Chao, Taipei (TW)

(73) Assignee: COMPAL ELECTRONICS, INC., Taipei (TW)

( * ) Notice: Subject to any disclaimer, the term of this patent is extended or adjusted under 35 U.S.C. 154(b) by 0 days.

(21) Appl. No.: 16/416,289

(22) Filed: May 20, 2019

(65) Prior Publication Data

US 2019/0358534 A1 Nov. 28, 2019

Related U.S. Application Data

(60) Provisional application No. 62/675,121, filed on May 22, 2018.

(51) Int. Cl.
*A63F 13/24* (2014.01)
*A63F 13/92* (2014.01)

(52) U.S. Cl.
CPC .............. *A63F 13/24* (2014.09); *A63F 13/92* (2014.09)

(58) Field of Classification Search
CPC ................................. A63F 13/24; A63F 13/92
See application file for complete search history.

(56) References Cited

U.S. PATENT DOCUMENTS

| 2004/0142749 A1* | 7/2004 | Ishimaru | ................ G05G 9/047 463/37 |
| 2007/0161398 A1* | 7/2007 | Chiu | ................... H04M 1/0247 455/550.1 |

(Continued)

FOREIGN PATENT DOCUMENTS

| CN | 101601931 | 12/2009 |
| TW | 201615248 | 5/2016 |

OTHER PUBLICATIONS

"Office Action of Taiwan Counterpart Application", dated May 4, 2020, p. 1-p. 5.

*Primary Examiner* — Omkar A Deodhar
*Assistant Examiner* — Shauna-Kay Hall
(74) *Attorney, Agent, or Firm* — JCIPRNET

(57) ABSTRACT

A game machine includes a main body, two gamepads, two sliding bases, a driving assembly, a switching assembly. The main body has an internal space and two openings communicated with the internal space. The two gamepads are disposed at two opposite sides and respectively corresponding to the two openings. The two sliding bases are located at the internal space and respectively connects to the two gamepads. The driving assembly is connected to the two sliding bases. The switching assembly is disposed at the main body, and is adapted to switch to a coupling state for fastened with the two sliding bases or a decoupling state for separated from the two sliding bases.

13 Claims, 12 Drawing Sheets

(56) References Cited

U.S. PATENT DOCUMENTS

| | | | | |
|---|---|---|---|---|
| 2007/0178966 | A1* | 8/2007 | Pohlman | A63F 13/06 |
| | | | | 463/36 |
| 2009/0312098 | A1* | 12/2009 | Chang | A63F 13/08 |
| | | | | 463/31 |
| 2012/0058821 | A1* | 3/2012 | Lan | A63F 13/92 |
| | | | | 463/30 |
| 2012/0271967 | A1* | 10/2012 | Hirschman | A63F 13/24 |
| | | | | 710/8 |
| 2012/0302347 | A1* | 11/2012 | Nicholson | A63F 13/06 |
| | | | | 463/37 |
| 2013/0095925 | A1* | 4/2013 | Xu | G06F 1/182 |
| | | | | 463/37 |
| 2013/0341214 | A1* | 12/2013 | King | A63F 13/98 |
| | | | | 206/216 |
| 2014/0206541 | A1* | 7/2014 | Oester | A01N 25/30 |
| | | | | 504/195 |
| 2014/0274394 | A1* | 9/2014 | Willis | G06F 3/0338 |
| | | | | 463/37 |
| 2015/0018101 | A1* | 1/2015 | Schoenith | A63F 13/98 |
| | | | | 463/37 |
| 2015/0084900 | A1* | 3/2015 | Hodges | G06F 1/1632 |
| | | | | 345/173 |
| 2016/0107082 | A1* | 4/2016 | Song | A63F 13/24 |
| | | | | 463/37 |
| 2016/0361633 | A1* | 12/2016 | Fujita | A63F 13/98 |

* cited by examiner

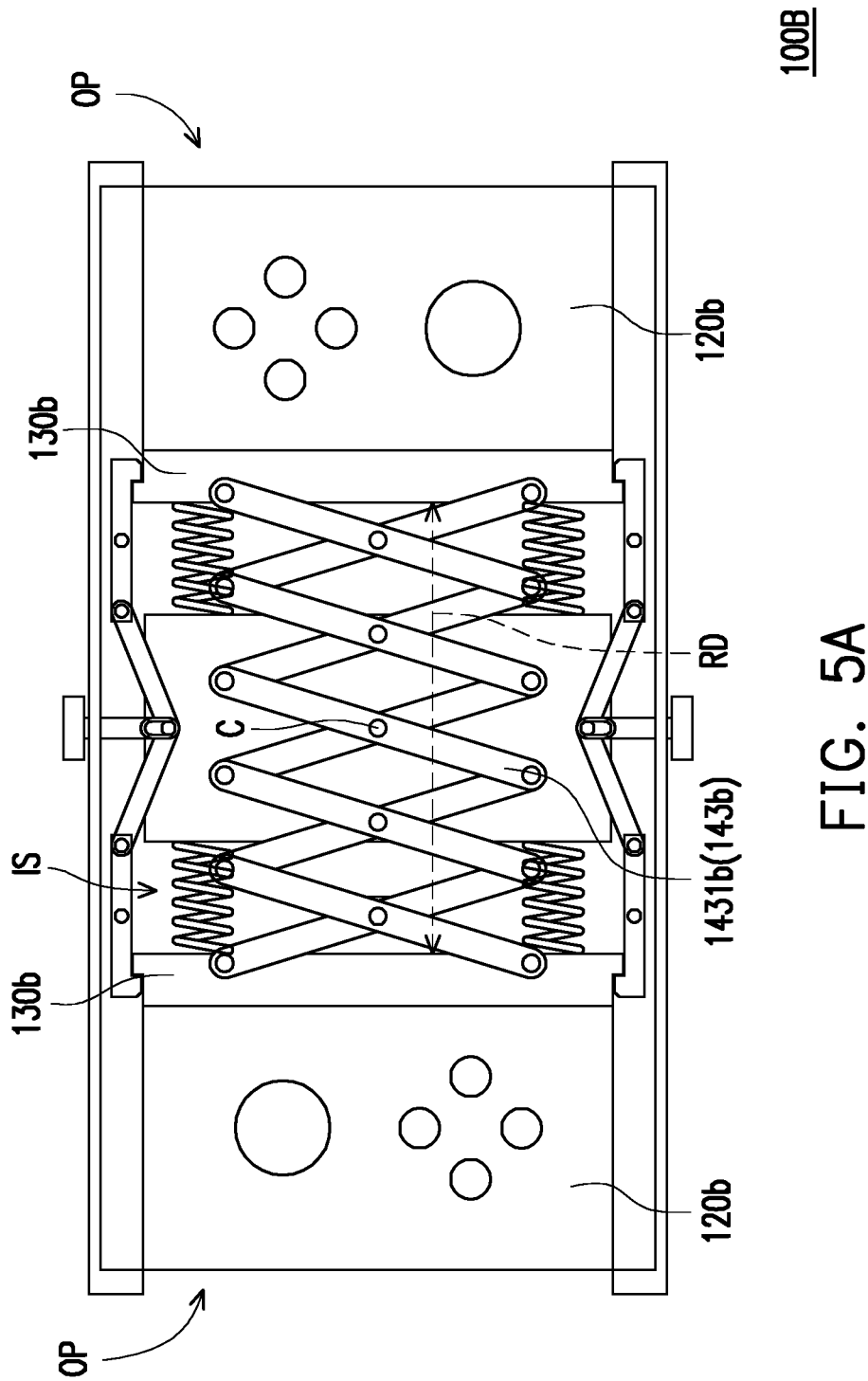

GAME MACHINE

CROSS REFERENCE TO RELATED APPLICATION

This application claims the priority benefit of U.S. provisional application Ser. No. 62/675,121, filed on May 22, 2018. The entirety of the above-mentioned patent application is hereby incorporated by reference herein and made a part of specification.

BACKGROUND

Technical Field

The disclosure relates to a game machine, and more particularly, relates to a game machine in which gamepads can be stored.

Description of Related Art

The existing game machines may be divided into two types, namely the home video game consoles and the handheld game consoles. A home video game console includes a main body for operating the games and a display required to be connected to a TV screen for image output. Since the home video game consoles feature greater hardware specifications, the home video game consoles deliver more favorable sound and light effects, image quality, and game plots.

A handheld game console is a small game console which is portable and has a display, so that a user may play games in a handheld manner. The main advantage of the handheld game consoles is that short-term entertainment is provided without limitation of locations. As regards an existing handheld game console, one gamepad is disposed at each side of two opposite sides of the console body, the volume of the handheld game console is thereby increased, so that the handheld game console may not be conveniently carried around. Therefore, how to reduce the volume of the handheld game consoles is an important issue.

SUMMARY

The disclosure provides a game machine in which gamepads are adapted to be stored, so that volume is reduced and the game machine may be conveniently carried around.

A game machine provided by an embodiment of the disclosure includes a main body, two gamepads, two sliding bases, a driving assembly, and a switching assembly. The main body has an internal space and two openings communicated with the internal space. The two gamepads are disposed at two opposite sides of the main body and respectively correspond to the two openings. The two sliding bases are located in the internal space and are respectively connected to the two gamepads. The driving assembly is connected to the two sliding bases. The switching assembly is disposed at the main body and is adapted to switch to a coupling state to be fastened to the two sliding bases or switch to a decoupling state to be separated from the two sliding bases. Herein, in the coupling state, the switching assembly limits sliding of the two sliding bases, so that the gamepads are stored in the internal space, and in the decoupling state, the driving assembly pushes the two sliding bases to respectively slide towards the two openings, so that the two gamepads respectively protrude out of the two openings.

Based on the above, in the game machine provided by the disclosure, the two gamepads may slide into the internal space of the main body. When the switching assembly is in the coupling state, relative sliding of the two gamepads are adapted to be limited, so that the two gamepads are stored in the internal space of the main body. In the coupling state, the volume of the game machine is reduced, such that the game machine may be conveniently carried around by the user. When the switching assembly is in the decoupling state, the relative sliding of the two gamepads is no longer limited, the two gamepads are thereby pushed by the driving assembly to be separated from each other and slide towards the two openings. In the decoupling state, the two gamepads individually protrude out of the two openings, that is, the two opposite sides of the main body, so the user may start playing games. In short, the two gamepads of the game machine provided by the disclosure may be freely stored or unfolded and thus are different from the fixed gamepads provided by existing game machines, such that the game machine provided by the disclosure exhibits reduced volume and may be conveniently carried around.

To make the aforementioned more comprehensible, several embodiments accompanied with drawings are described in detail as follows.

BRIEF DESCRIPTION OF THE DRAWINGS

FIG. 5A is a schematic view of a game machine in the storage state according to another embodiment of the disclosure.

DESCRIPTION OF THE EMBODIMENTS

Figure 1A:
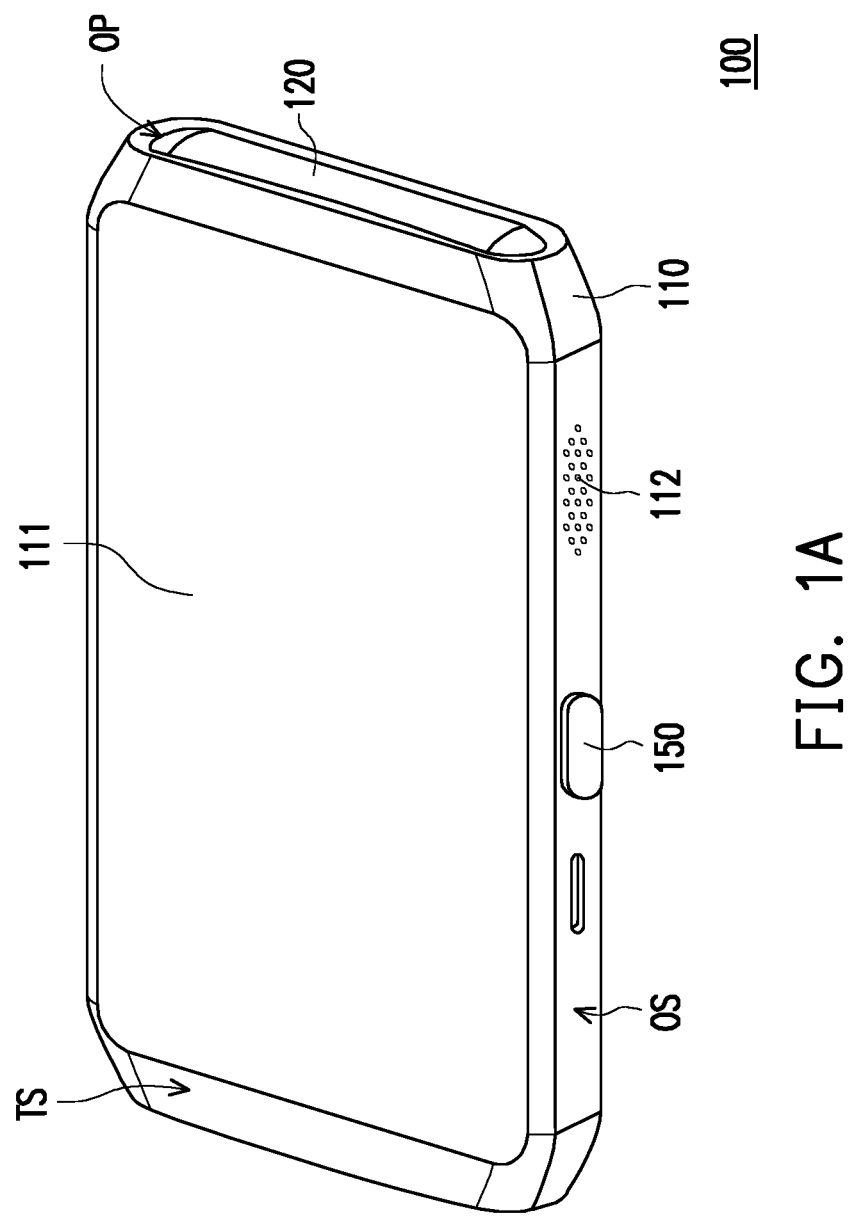
FIG. 1A is a schematic three-dimensional view of a game machine in a storage state according to an embodiment of the disclosure.
Figure 1B:
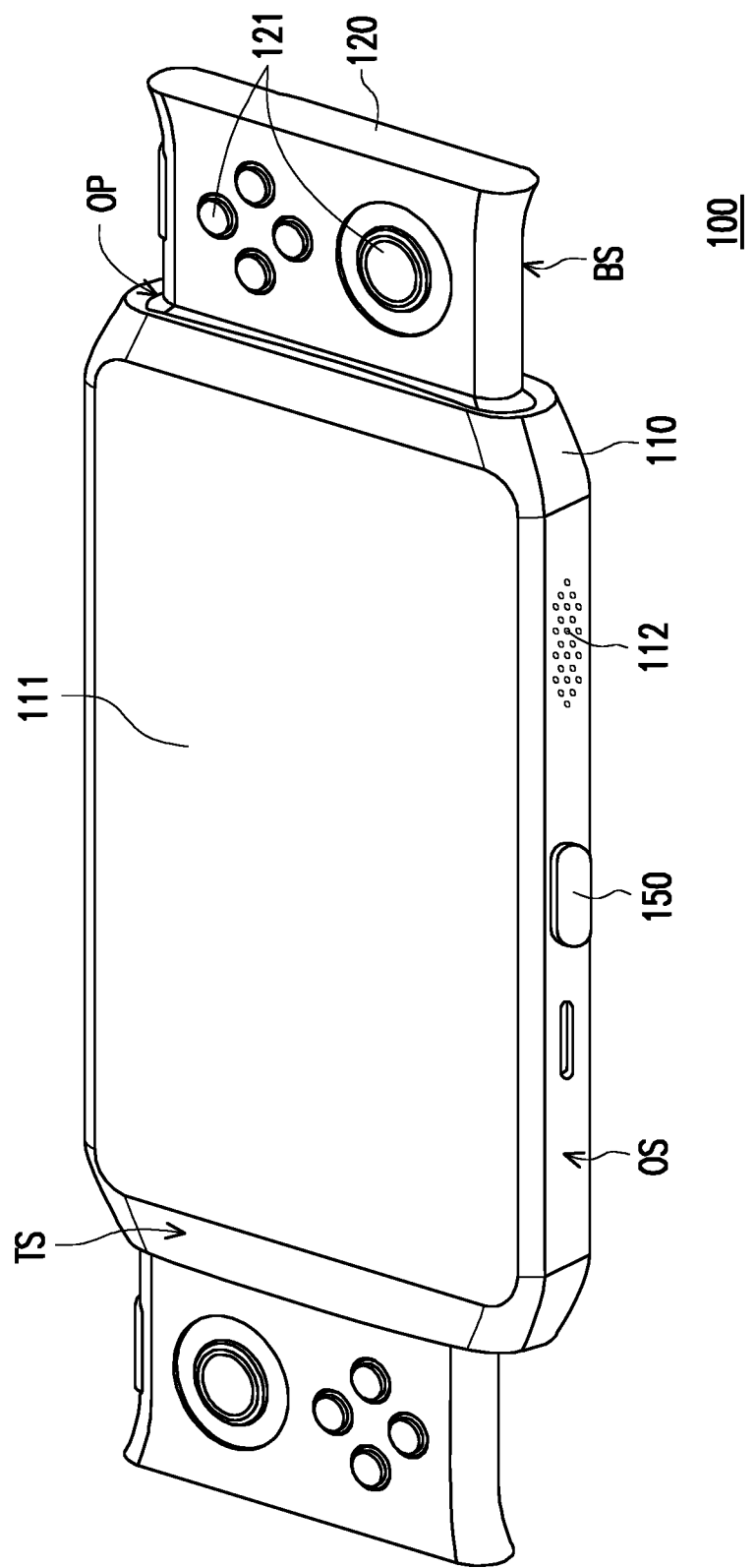
FIG. 1B is a schematic three-dimensional view of the game machine of FIG. 1A in an unfolded state.
Figure 2A:
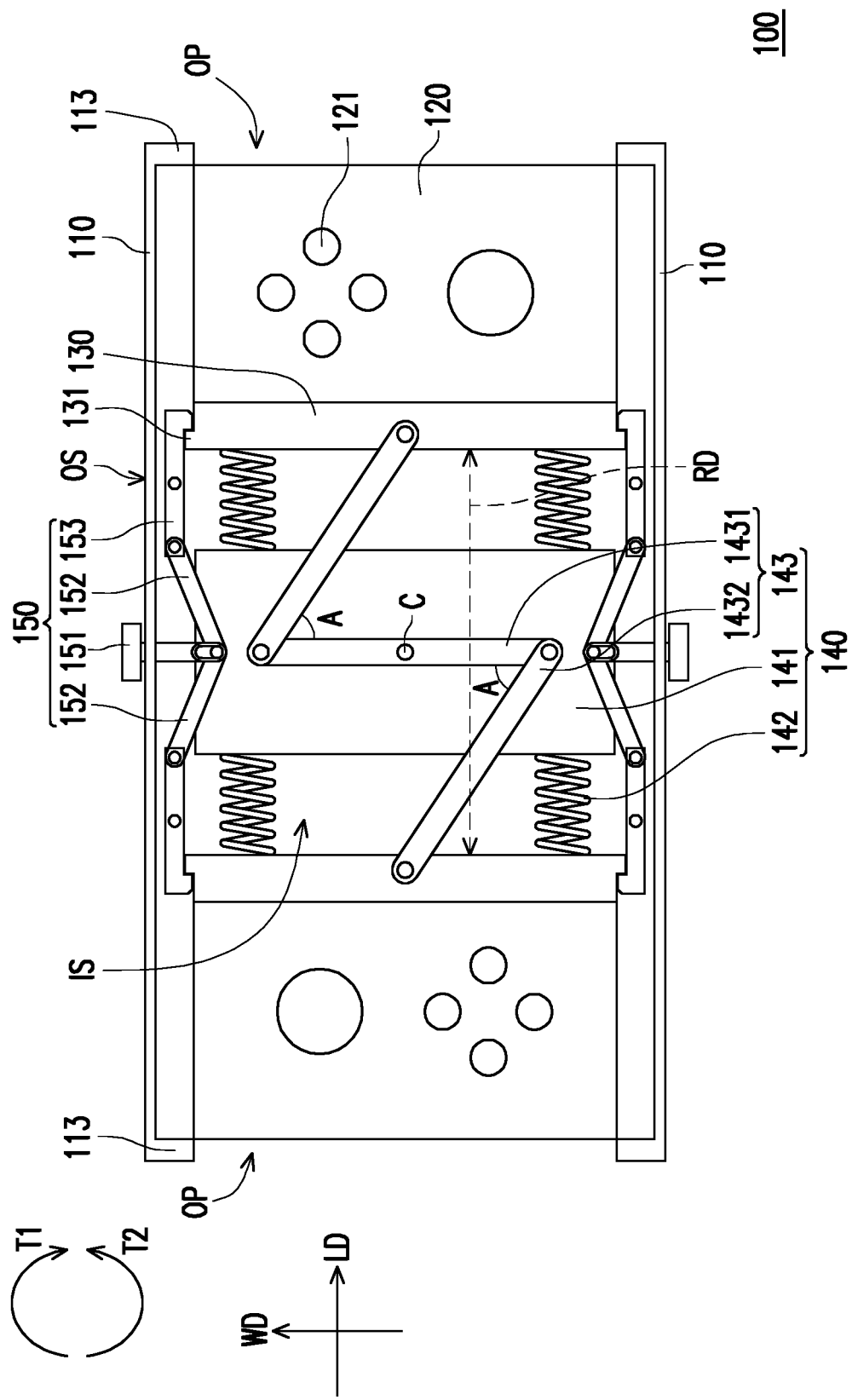
FIG. 2A is a schematic view of the game machine of FIG. 1A in the storage state.
Figure 2B:
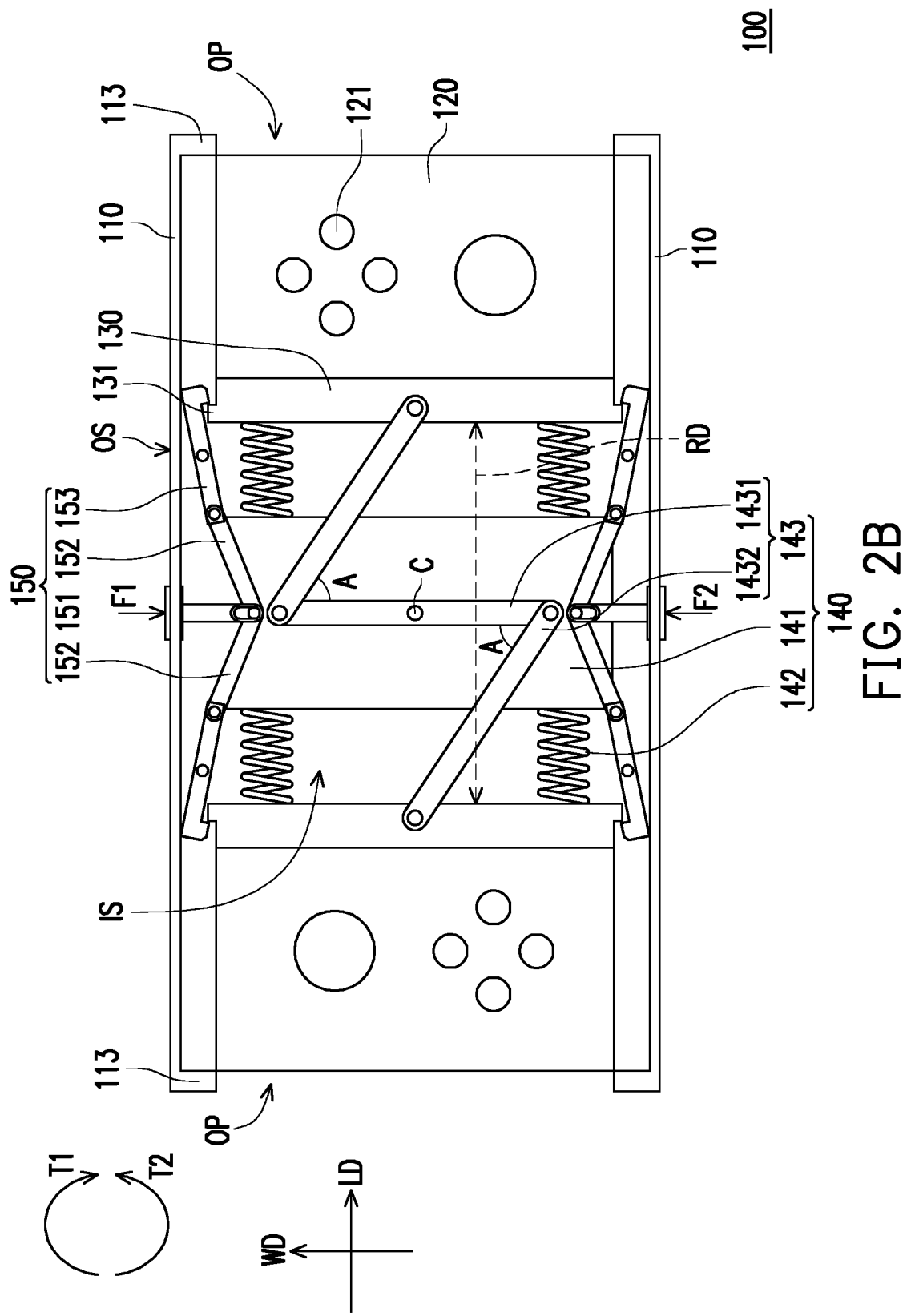
FIG. 2B is a schematic view of the game machine of FIG. 2A in which restriction is lifted.
Figure 2C:
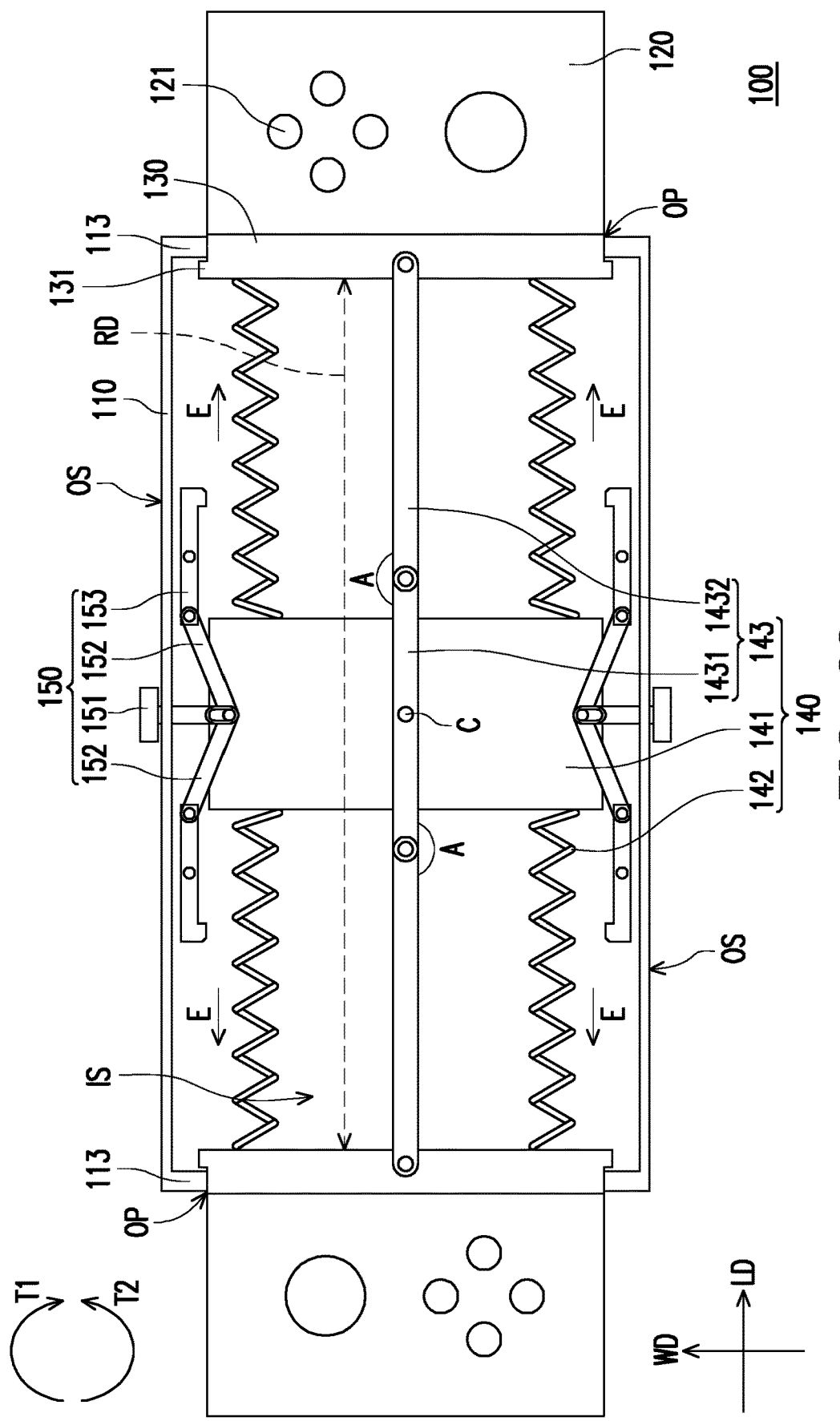
FIG. 2C is a schematic view of the game machine of FIG. 2A in the unfolded state.

FIG. 1A is a schematic three-dimensional view of a game machine in a storage state according to an embodiment of the disclosure. FIG. 1B is a schematic three-dimensional view of the game machine of FIG. 1A in an unfolded state. FIG. 2A is a schematic view of the game machine of FIG. 1A in the storage state. FIG. 2B is a schematic view of the game machine of FIG. 2A in which restriction is lifted. FIG. 2C is a schematic view of the game machine of FIG. 2A in the unfolded state.

With reference to FIG. 1A and FIG. 2A, a game machine 100 provided by the present embodiment includes a main body 110, two gamepads 120, two sliding bases 130, a driving assembly 140, and a switching assembly 150. For instance, the game machine of this embodiment is, for example, SONY PSP (PlayStation Portable), Nintendo Switch, Nintendo 3DS, or other similar handheld game consoles, which is not limited by the disclosure.

With reference to FIG. 1A and FIG. 2A, the main body 110 has an internal space IS and two openings OP communicated with the internal space IS, where the internal space IS of the main body 110 is configured to place a central processing unit, a graphics processor, a storage unit, a storage battery, and other related electronic devices (not shown in the drawings). A display panel 111 is disposed on a top surface TS of the main body 110 and is electrically coupled the graphics processor for displaying a game screen. An audio component 112 is disposed on an outer surface OS of the main body 110 and is electrically coupled to the central processing unit for outputting sound effects of a game. A connection port is located on the outer surface OS of the main body 110 and is electrically coupled to the storage unit and the storage battery for transmitting data and charging.

The two gamepads 120 are disposed at two opposite sides of the main body 110 and respectively correspond to the two openings OP. Practically, the two gamepads 120 are disposed at left and right sides of the main body 110 to correspond to two hands of a user, so that the palms of the user may hold a bottom surface BS of the main body 110 and the two gamepads 120, the thumbs of the two hands may control a plurality of function buttons 121 on the two gamepads 120, so as to input corresponding game commands.

The two sliding bases 130 may be located in the internal space IS and slide in opposite directions and are connected to the two gamepads 120. In short, the two sliding bases 130 are adapted to approach each other or move away from each other in a length direction LD of the internal space IS.

The driving assembly 140 is disposed in the internal space IS, is connected to the two sliding bases 130, and is configured to push the two sliding bases 130 to move away from each other. The switching assembly 150 is disposed at the main body 110 and is adapted to switch to a coupling state to be fastened to the two sliding bases 130 and to restrict relative sliding of the two sliding bases 130 or is adapted to switch to a decoupling state to be decoupled from the two sliding bases 130 and no longer restricts relative sliding generated by the two sliding bases 130.

With reference to FIG. 1B, FIG. 2B, and FIG. 2C, when the switching assembly 150 is in the coupling state, the switching assembly 150 restricts sliding of the two sliding bases 130, so that the two gamepads 120 are stored in the internal space IS. When the switching assembly 150 is in the decoupling state, the driving assembly 140 pushes the two sliding bases 130 to slide towards the two openings OP, so that the two gamepads 120 protrude out of the two openings OP of the main body 110.

With reference to FIG. 2A to FIG. 2C, the driving assembly 140 includes a securing base 141, a plurality of elastic members 142, and a synchronization structure 143. The securing base 141 is disposed in the internal space IS and is located between the two sliding bases 130. The plurality of elastic members 142 are connected to two opposite sides of the securing base 141 facing the two sliding bases 130, where the plurality of elastic members 142 are, for example, compressed springs and may accumulate an elastic force E when being pressed. Two ends of each of the elastic members 142 respectively are propped against a corresponding lateral side of the securing base 141 and each of the corresponding sliding bases 130, so as to push each of the sliding bases 130 to move away from the securing base 141. The synchronization structure 143 is disposed on the securing base 141, and two ends of the synchronization structure 143 are connected to the sliding bases 130 for driving the sliding bases 130 to synchronously slide in opposite directions.

The synchronization structure 143 includes a main connection rod 1431 and two sub connection rods 1432. The main connection rod 1431 is pivotally connected to a center C of the securing base 141, that is, the main connection rod 1431 may pivot relative to the securing base 141. The two sub connection rods 1432 are pivotally connected to two end portions EP of the main connection rod 1431 individually, and each of the sub connection rods 1432 is pivotally connected to each of the corresponding sliding bases 130. When the main connection rod 1431 pivots in a first rotation direction T1 (i.e., the switching assembly 150 is gradually switched to the decoupling state), the two sub connection rods 1432 turn and are connected to the main connection rod 1431 in a straight line, so that a relative distance RD between the two sliding bases 130 is increased. When the main connection rod 1431 pivots in a second rotation direction T2 opposite to the first rotation direction T1 (i.e., the switching assembly 150 is gradually switched to the coupling state), the two sub connection rods 1432 turn and form two acute angles A with the main connection rod 1431 so that the relative distance RD between the two sliding bases 130 is decreased.

In short, the elastic force E of the plurality of elastic members 142 located at two sides of the securing base 141 pushes the corresponding two sliding bases 130, so the two sliding bases 130 are separated from each other in the length direction LD. Since the two sliding bases 130 are restricted to the synchronization structure 143, the two sliding bases 130 are set to be synchronously stored in the internal space IS of the main body 110 or synchronously protrude out of the main body 110.

With reference to FIG. 2A to FIG. 2C, moreover, each of the sliding bases 130 has two limiting convex parts 131. In the coupling state, the switching assembly 150 is fastened to the plurality of limiting convex parts 131 of the two sliding bases 130 together, so that each of the sliding bases 130 pushes and compresses each of the corresponding elastic members 142 o In the decoupling state, the switching assembly 150 is separated from the plurality of limiting convex parts 131 of the two sliding bases 130, so that each of the sliding bases 130 is released and no longer compresses the plurality of elastic members 142.

Specifically, the switching assembly 150 includes two buckle members 151 and two release buttons 152. Each of the buckle members 151 has two buckles 153 adapted to be fastened to two corresponding limiting convex parts 131 of each of the two sliding bases 130, so that the two sliding bases 130 are restricted to the plurality of buckle members 151. Each of the release buttons 152 is pivotally connected to each of the corresponding buckle members 151 and partially protrudes out of the outer surface OS of the main body 110 and is adapted to drive two buckle members 153 of each of the corresponding buckle members 151 to relatively rotate to be separated from the plurality of limiting convex parts 131 of the two sliding bases 130. Herein, each of the release buttons 152 is pushed by the elastic member (not shown in the drawings) in an initial state to be partially protrude out of the main body 110. Further, the user's thumbs and index fingers may simultaneously press the two release buttons 152 to drive the two buckle members 151 to pivot and to further lift restriction of fastening between the plurality of buckles 153 and the limiting convex parts 131. When the force applied by the user is lifted, the two release buttons 152 drive the two buckle members 151 to return to original positions.

Further, the main body 110 includes a plurality of barriers 113. When the two gamepads 120 protrude out of the two openings OP of the main body 110, the plurality of barriers 113 are fastened to the two limiting convex parts 131 of the corresponding sliding bases 130, such that the two sliding bases 130 are limited in the internal space IS and correspond to the two openings OP.

A switching process in which the game machine 100 is switched between the storage state and the unfolded state is described as follows. With reference to FIG. 1A and FIG. 2A, the game machine 100 is in the storage state. At this time, the two gamepads 120 are stored in the internal space IS of the main body 110, the plurality of limiting convex parts 131 of the two sliding bases 130 are restricted by and fastened to the plurality of buckles 153, so that the relative distance RD between the two sliding bases 130 is minimized and the plurality of elastic members 142 are compressed at the same time, so that each of the elastic members 142 accumulates the elastic force E. Under such circumstance, the main connection rod 1431 pivots in the second rotation direction T2 to be parallel to a width direction WD of the internal space IS, and the two sub connection rods 1432 pivot as well as being driven by the two end portions of the main connection rod 1431 and form the two acute angles A with the main connection rod 1431.

With reference to FIG. 1B, FIG. 2B, and FIG. 2C, forces F1 and F2 are simultaneously applied to the two release buttons 152, so that the two release buttons 152 are adapted to relatively approach in the width direction WD of the internal space IS to submerge the outer surface OS of the main body 110. At the same time, the two release buttons 152 respectively drive the two buckle members 151, so that the two buckles 153 of each of the buckle members 151 are separated from the two limiting convex parts 131 fastened thereto. Therefore, the two sliding bases 130 no longer compress the plurality of elastic members 142 continuously, and the plurality of elastic members 142 release the accumulated elastic forces E simultaneously, so as to push the two sliding bases 130 to be separated from each other in the length direction LD. At the same time, the two sliding bases 130 respectively drive the two sub connection rods 1432 to turn, so that the main connection rod 1431 pivots in the first rotation direction T1 to be parallel to the length direction LD of the internal space IS. The plurality of limiting convex parts 131 of the two sliding bases 130 are respectively fastened to the plurality of barriers 113 of the main body 110, so that the relative distance RD between the two sliding bases 130 is maximized, and the two gamepads 120 protrude out of the two openings OP. Under such circumstance, the game machine 100 is switched to the unfolded state.

On the contrary, if the game machine 100 is to be switched from the unfolded state to the storage state, the two hands only have to apply a force to the two gamepads 120, and that the two sliding bases 130 are driven to relatively approach towards the securing base 141, so that the relative distance RD is gradually decreased, and the plurality of elastic members 142 are compressed by the two sliding bases 130 at the same time. Finally, the two limiting convex parts 131 of each of the sliding bases 130 drive and pass through two of the corresponding buckles 153, so that the sliding bases 130 are fastened to and limited by the switching assembly 150.

Figure 3A:
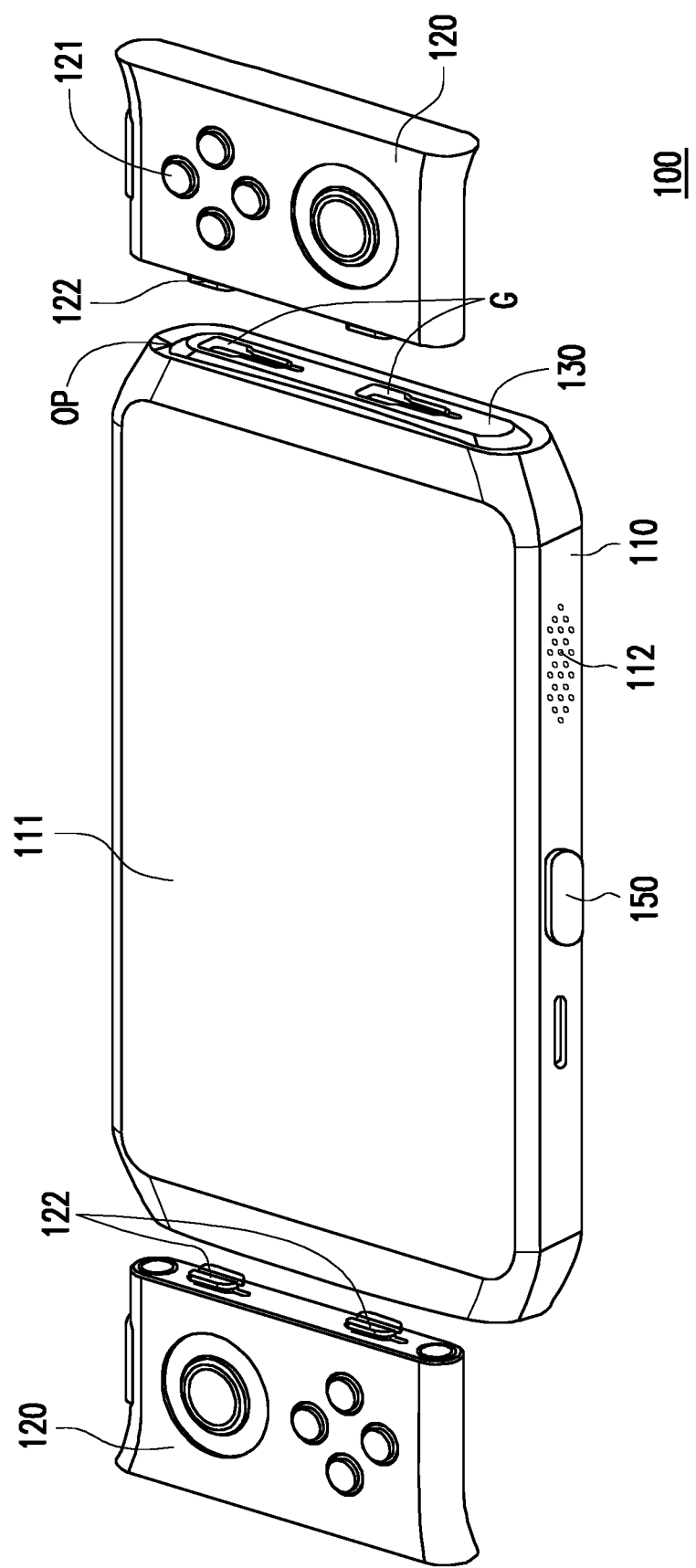
FIG. 3A is a schematic three-dimensional view of separated gamepads of the game machine of FIG. 1A.
Figure 3B:
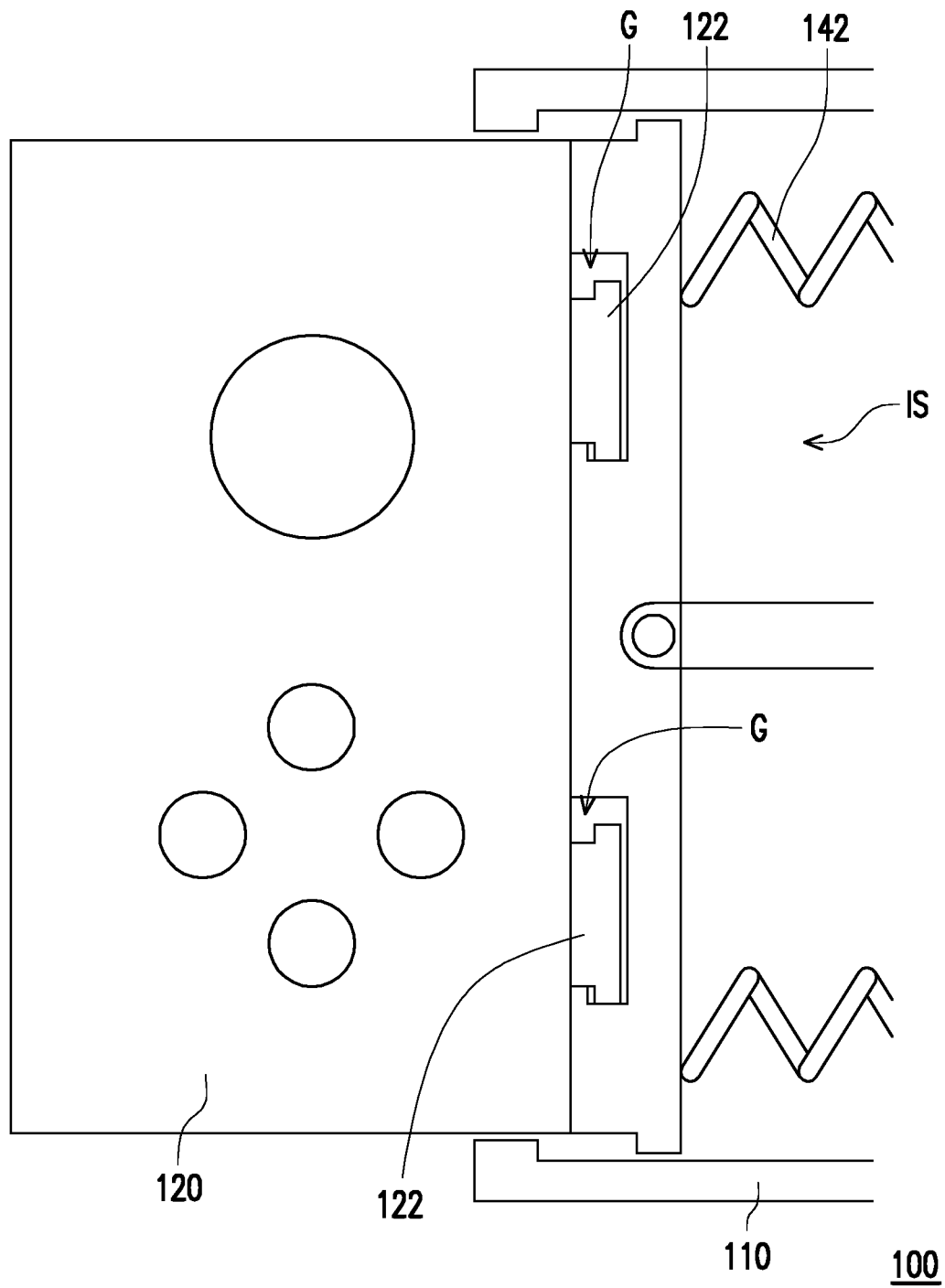
FIG. 3B to FIG. 3C are schematic three-dimensional views of a separation process of the gamepads of the game machine of FIG. 3A.
Figure 3C:
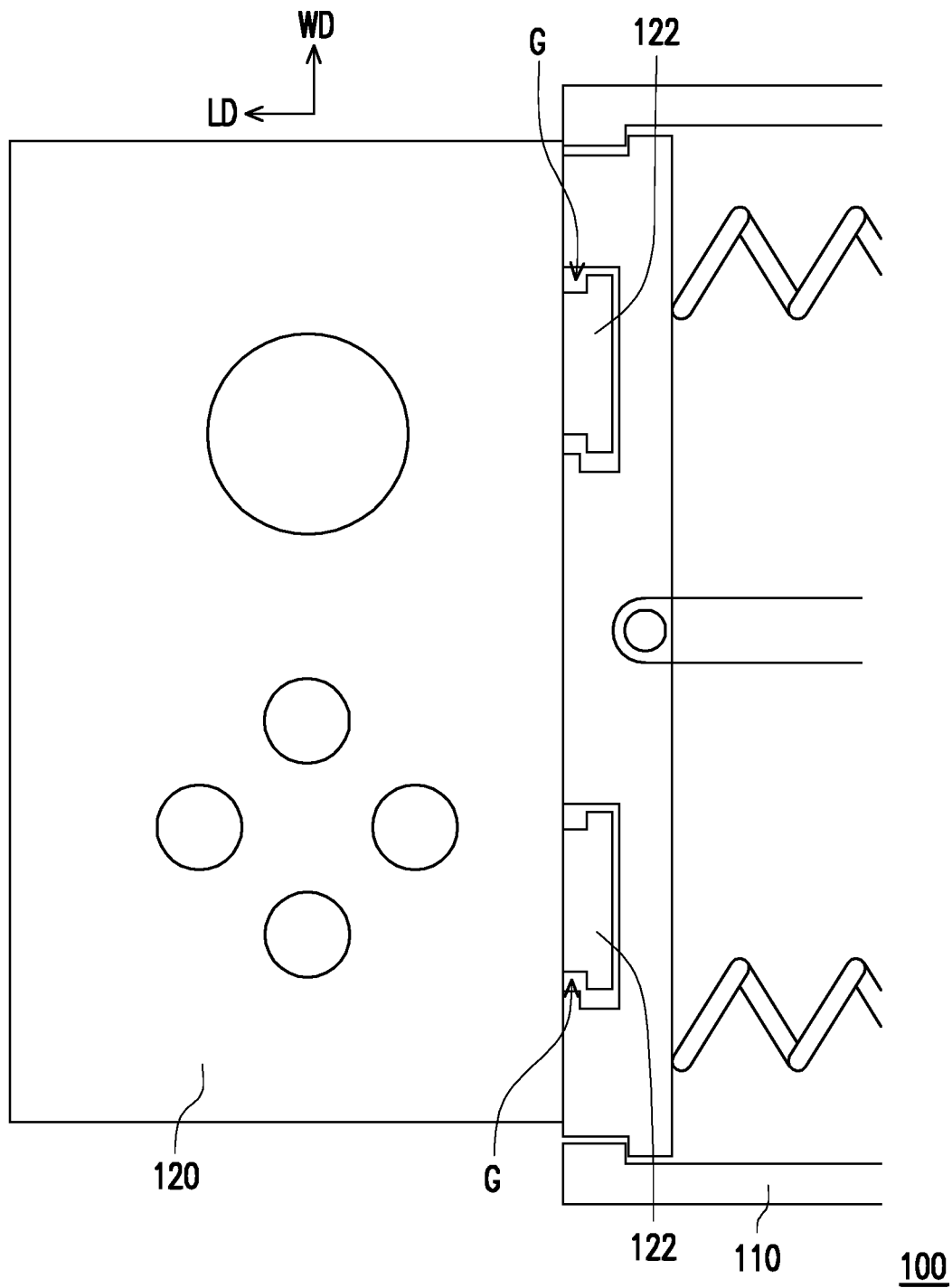

FIG. 3A is a schematic three-dimensional view of separated gamepads of the game machine of FIG. 1A. FIG. 3B to FIG. 3C are schematic three-dimensional views of a separation process of the gamepads of the game machine of FIG. 3A.

With reference to FIG. 3A to FIG. 3C, each of the sliding bases 130 in the present embodiment has a plurality of slots G (two are shown in the drawings), and the two slots G of each of the sliding bases 130 face the corresponding openings OP. Each of the gamepads 120 has a plurality of positioning members 122 (two are shown in the drawings), and the two positioning members 122 of each of the gamepads 120 are fastened into the two slots G of the corresponding sliding base 130, so that each of the corresponding gamepads 120 and each of the corresponding sliding bases 130 are integrally connected. Moreover, connection terminals are disposed in the two slots G of each of the sliding bases 130, and the two positioning members 122 of each of the gamepads 120 are adapted to be electrically connected to the central processing unit through the connection terminals, so that transmission of signals and commands is performed.

Further, both the gamepads 120 and the sliding bases 130 are detachable disposed. A detachment process of the gamepads 120 and the sliding bases 130 is described as follows. With reference to FIG. 3B and FIG. 1B, the two positioning members 122 of the gamepad 120 are respectively engaged with the two slots G of the sliding base 130. In the detachment process, the gamepad 120 is driven to move in the width direction WD, so that the two positioning members 122 are released from engagement with the two slots G. Next, the gamepad 120 is driven to move in the length direction LD, so that the two positioning members 122 of the gamepad 120 are completely separated from the two slots G of the sliding base 130. In this way, when the gamepads 120 are damaged, the gamepads 120 may be directly detached for repairmen or replacement without repairing the entire game machine 100.

It should be noted that the reference numerals and a part of the contents in the previous embodiment are used in the following embodiments, in which identical reference numerals indicate identical or similar components, and repeated description of the same technical contents is omitted. Please refer to the descriptions of the previous embodiment for the omitted contents, which will not be repeated hereinafter.

Figure 4A:
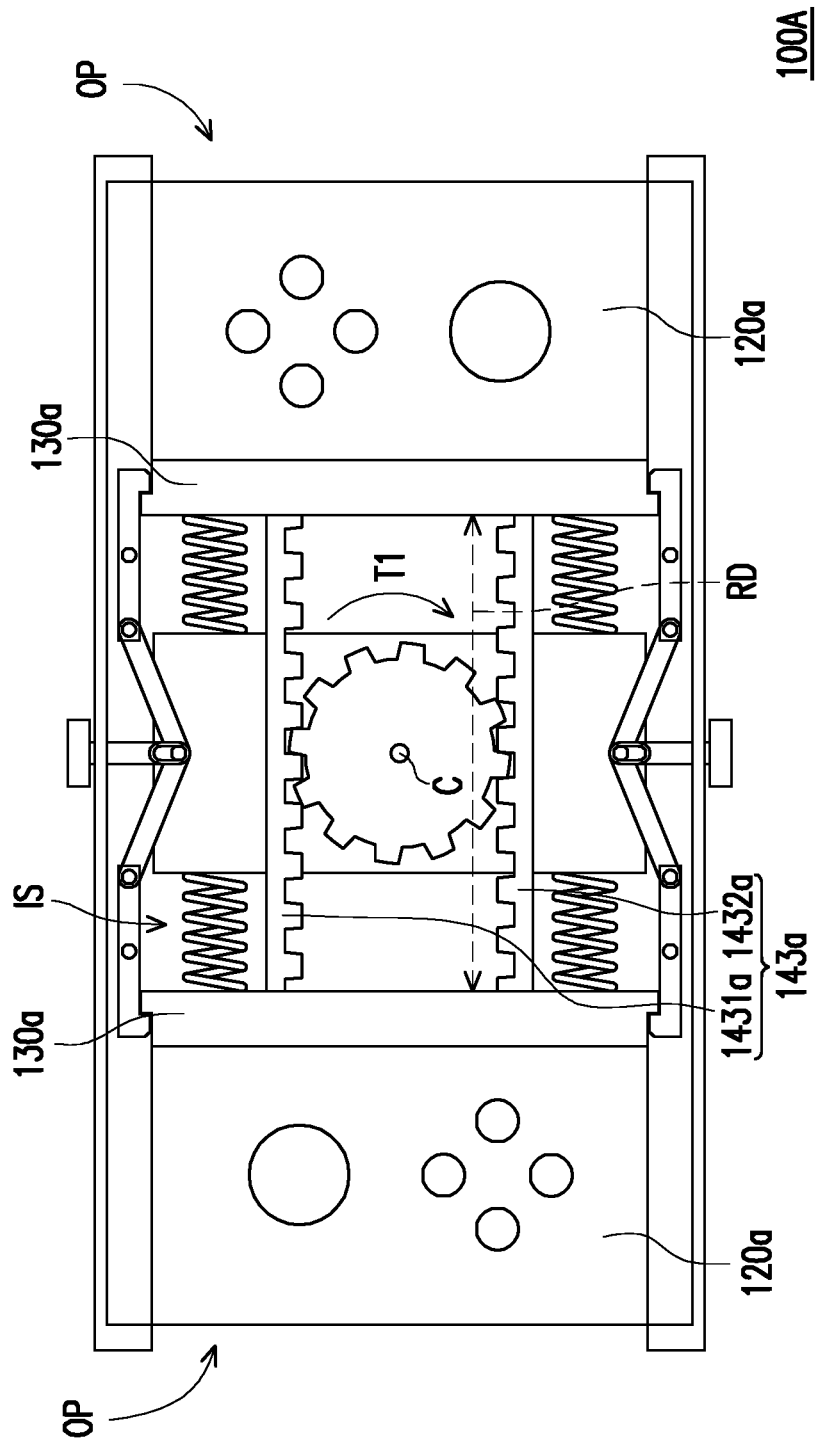
FIG. 4A is a schematic view of a game machine in the storage state according to another embodiment of the disclosure.
Figure 4B:
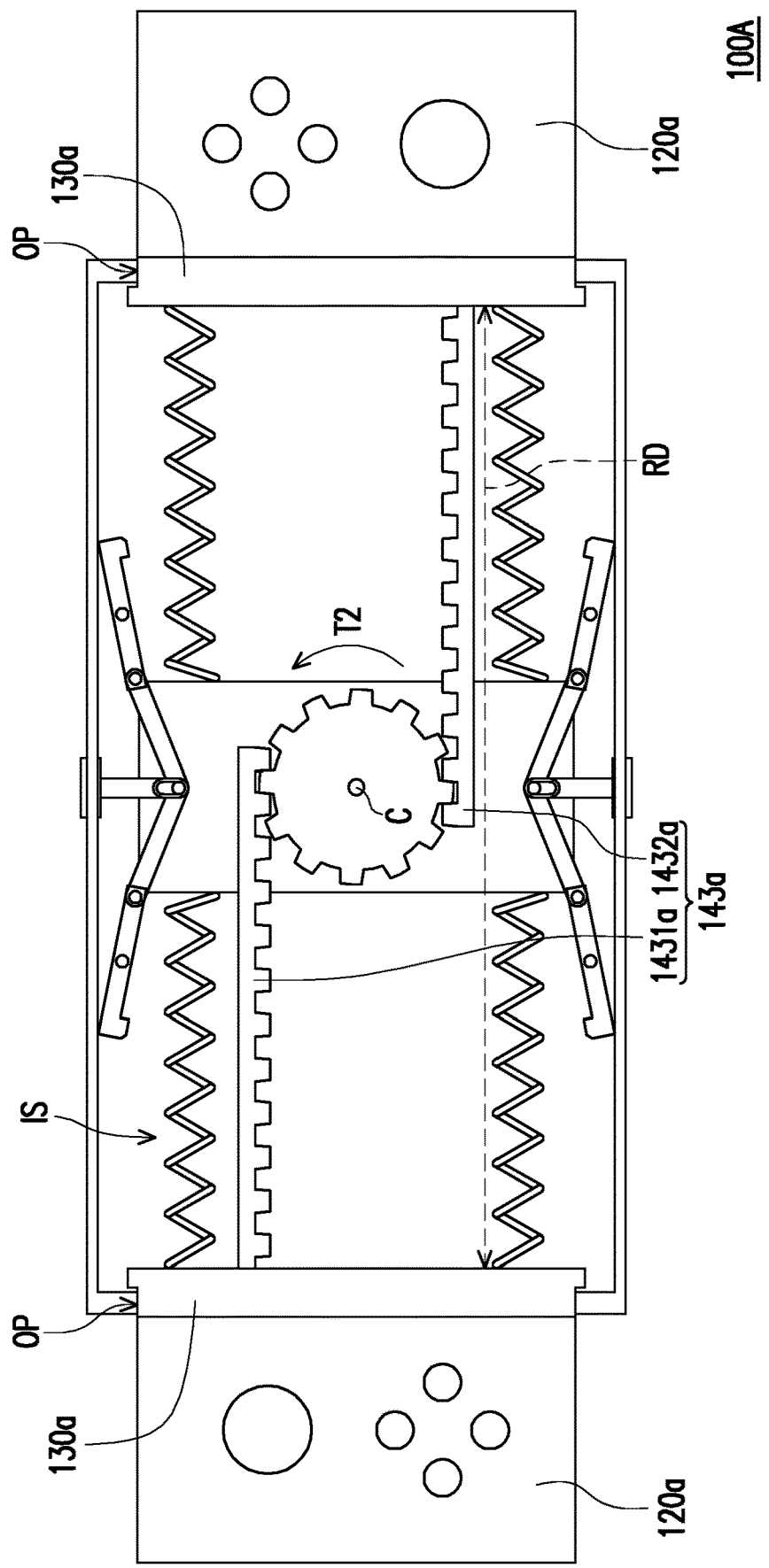
FIG. 4B is a schematic view of the game machine of FIG. 4A in the unfolded state.

FIG. 4A is a schematic view of a game machine in the storage state according to another embodiment of the disclosure. FIG. 4B is a schematic view of the game machine of FIG. 4A in the unfolded state.

With reference to FIG. 4A and FIG. 4B, a game machine 100A of this embodiment is similar to the game machine 100 of FIG. 2A. A difference therebetween is that a synchronization structure 143a includes a pinion 1431a and two racks 1432a. The pinion 1431a is pivotally connected to a center C of a securing base 141a. The two racks 1432a respectively engage two opposite sides of the pinion 1431a and are parallel to each other, and each of the racks 1432a is connected to each corresponding sliding base 130a. Specifically, the two racks 1432a may relatively move through pivoting of the pinion 1431a.

When the pinion 1431a pivots in the first rotation direction T1, the two racks 1432a are set to relatively move, so that an extent to which the two racks 1432a are overlapped is increased, such that a relative distance RD between two sliding bases 130a is further reduced. Under such circumstance, the two sliding bases 130a relatively approach, so as to drive the two gamepads 120a to be stored in an internal space IS of a main body 110a.

When the pinion 1431a pivots in the second rotation direction T2 opposite to the first rotation direction T1, the two racks 1432a are set to relatively move, so that the extent to which the two racks 1432a are overlapped is decreased, such that the relative distance RD between the two sliding bases 130a is increased. Under such circumstance, the two sliding bases 130a relatively move away from each other, so as to drive the two gamepads 120a to protrude out of the two openings OP of the main body 110a.

Figure 5B:
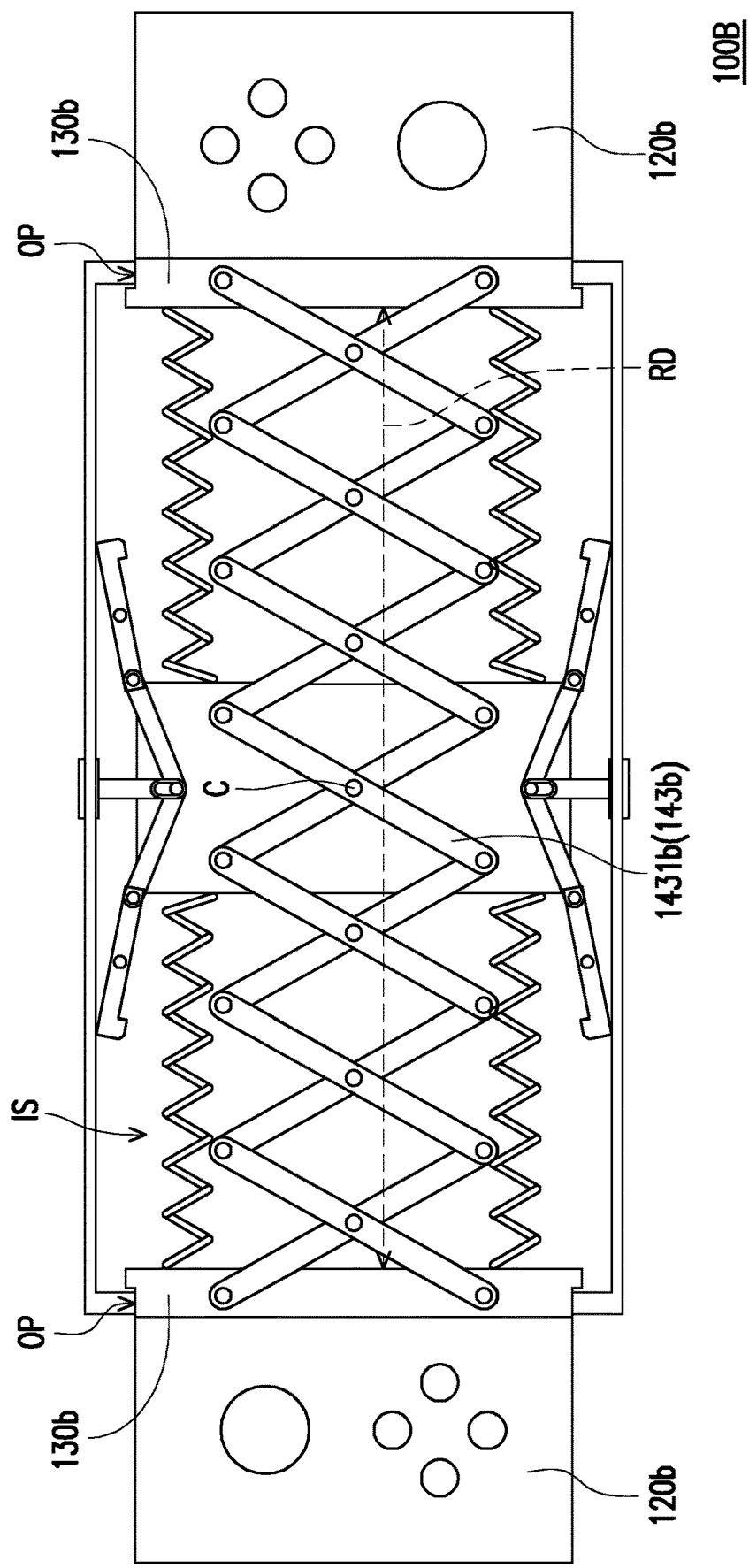
FIG. 5B is a schematic view of the game machine of FIG. 5A in the unfolded state.

FIG. 5A is a schematic view of a game machine in the storage state according to another embodiment of the disclosure. FIG. 5B is a schematic view of the game machine of FIG. 5A in the unfolded state.

With reference to FIG. 5A and FIG. 5B, a game machine 100B of this embodiment is similar to the game machine 100 of FIG. 2A. A difference therebetween is that a synchronization structure 143b includes a scissor-type connection rod group 1431b pivotally connected to a center C of a securing base 141b, and two end portions of the scissor-type connection rod group 1431b respectively are pivotally connected to two sliding bases 130b. Specifically, the scissor-type connection rod group 1431b may relatively move through pivoting.

When the scissor-type connection rod group 1431b is relatively unfolded, a relative distance RD between the two sliding bases 130b is increased. Under such circumstance, the two sliding bases 130b relatively move away from each other, so as to drive the two gamepads 120b to protrude out of the two openings OP of the main body 110b. When the scissor-type connection rod group 1431b is relatively folded, the relative distance RD between the two sliding bases 130b is decreased. Under such circumstance, the two sliding bases 130b relatively approach, so as to drive two gamepads 120b to be stored in the internal space IS of the main body 110a.

In view of the foregoing, in the game machine provided by the disclosure, the two gamepads may slide into the internal space of the main body. When the switching assembly is in the coupling state, relative sliding of the two gamepads are adapted to be limited, so that the two gamepads are stored in the internal space of the main body. In the coupling state, the volume of the game machine is reduced, such that the game machine may be conveniently carried around by the user. When the switching assembly is in the decoupling state, the relative sliding of the two gamepads is no longer limited, the two gamepads are thereby pushed by the driving assembly to be separated from each other and slide towards the two openings. In the decoupling state, the two gamepads individually protrude out of the two openings, that is, the two opposite sides of the main body, so the user may start playing games. In short, the two gamepads of the game machine provided by the disclosure may be freely stored or unfolded and thus are different from the fixed gamepads provided by existing game machines, such that the game machine provided by the disclosure exhibits reduced volume and may be conveniently carried around.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A game machine, comprising:
a main body, having an internal space and two openings communicated with the internal space;
two gamepads, disposed at two opposite sides of the main body, respectively corresponding to the two openings;
two sliding bases, slidably disposed in the internal space, respectively connected to the two gamepads;
a driving assembly, connected to the sliding bases; and
a switching assembly, disposed at the main body, adapted to switch to a coupling state to be fastened to the sliding bases or switch to a decoupling state to be separated from the sliding bases,
wherein the switching assembly limits sliding of the sliding bases in the coupling state so that the gamepads are stored in the internal space, and the driving assembly pushes the sliding bases to respectively slide towards the openings in the decoupling state, so that the gamepads respectively protrude out of the openings.

2. The game machine as claimed in claim 1, wherein the driving assembly comprises a securing base and a plurality of elastic members, the securing base is disposed in the internal space and is located between the two sliding bases, and two ends of each of the elastic members respectively are propped against the securing base and each of the corresponding sliding bases, so as to push each of the sliding bases to move away from the securing base.

3. The game machine as claimed in claim 2, wherein each of the sliding bases has two limiting convex parts, the switching assembly is fastened to the limiting convex parts in the coupling state so that each of the sliding bases pushes each of the elastic members, and the switching assembly is separated from the limiting convex parts in the decoupling state, so that each of the sliding bases releases the elastic members.

4. The game machine as claimed in claim 3, wherein the switching assembly comprises at least one buckle member and at least one release button, the at least one buckle member has two buckles adapted to be fastened to the corresponding limiting convex parts of the sliding bases, and the at least one release button is pivotally connected to the at least one buckle member, partially protrudes out of the main body, and is adapted to drive the two buckles to relatively rotate to be separated from the limiting convex parts.

5. The game machine as claimed in claim 3, wherein the main body comprises a plurality of barriers, and the barriers respectively are fastened to the limiting convex parts of the sliding bases when the gamepads protrude out of the openings.

6. The game machine as claimed in claim 1, wherein the driving assembly further comprises a synchronization structure disposed on the securing base, connected to the sliding bases, and configured to drive the sliding bases to synchronously slide in opposite directions.

7. The game machine as claimed in claim 6, wherein the synchronization structure comprises a main connection rod and two sub connection rods, the main connection rod is pivotally connected to a center of the securing base, the two sub connection rods are respectively pivotally connected to two end portions of the main connection rod, and each of the sub connection rods is pivotally connected to each of the corresponding sliding bases.

8. The game machine as claimed in claim 7, wherein the sub connection rods turn and are connected to the main connection rod in a straight line when the main connection rod pivots in a first rotation direction, so that a relative distance between the two sliding bases is increased, and the sub connection rods turn and form two acute angles with the main connection rod when the main connection rod pivots in a second rotation direction opposite to the first rotation direction, so that the relative distance between the two sliding bases is decreased.

9. The game machine as claimed in claim 6, wherein the synchronization structure comprises a pinion and two racks, the pinion is pivotally connected to a center of the securing base, the two racks respectively engage two opposite sides of the pinion and are parallel to each other, and each of the racks is connected to each of the corresponding sliding bases.

10. The game machine as claimed in claim 9, wherein the racks are set to relatively move when the pinion pivots in a first rotation direction, so that an extent to which the racks are overlapped is increased, such that a relative distance between the two sliding bases is further reduced, and the racks are set to relatively move when the pinion pivots in a second rotation direction opposite to the first rotation direction, so that the extent to which the racks are overlapped is decreased, such that the relative distance between the two sliding bases is increased.

11. The game machine as claimed in claim 6, wherein the synchronization structure comprises a scissor-type connection rod group pivotally connected to a center of the securing base, and two end portions of the scissor-type connection rod group respectively are pivotally connected to the two sliding bases.

12. The game machine as claimed in claim 11, wherein a relative distance between the two sliding bases is increased when the scissor-type connection rod group is relatively unfolded, and the relative distance between the two sliding bases is decreased when the scissor-type connection rod group is relatively folded.

13. The game machine as claimed in claim 1, wherein each of the sliding bases has a plurality of slots, each of the gamepads has a plurality of positioning members, and the positioning members are fastened into the slots, so that each of the corresponding gamepads and each of the sliding bases are integrally connected.

\* \* \* \* \*